United States Patent

Massara

Patent Number: 5,895,096
Date of Patent: Apr. 20, 1999

[54] VEHICLE SEAT BACK ASSEMBLY AND METHOD OF MAKING A VEHICLE SEAT BACK ASSEMBLY

[75] Inventor: Andrew J. Massara, Vargön, Sweden

[73] Assignee: Lear Corporation, Southfield, Mich.

[21] Appl. No.: 08/827,665

[22] Filed: Apr. 10, 1997

[51] Int. Cl.$^6$ ........................................................ A47C 7/02
[52] U.S. Cl. ........................... 297/452.34; 297/452.35; 297/452.38; 297/452.18
[58] Field of Search ........................... 297/452.18, 452.2, 297/452.31, 452.32, 452.33, 452.34, 452.35, 452.36, 452.38, 452.55, 452.59, 452.61

[56] References Cited

U.S. PATENT DOCUMENTS

| | | | |
|---|---|---|---|
| 3,529,866 | 9/1970 | Getz | 297/452.35 X |
| 3,669,499 | 6/1972 | Semplonius et al. | 297/452.38 X |
| 4,192,548 | 3/1980 | Williams | 297/452.48 |
| 4,725,095 | 2/1988 | Benson et al. | 297/284 |
| 4,781,416 | 11/1988 | Johnson et al. | 297/362 |
| 4,781,417 | 11/1988 | Shipman et al. | 297/458 |
| 4,830,433 | 5/1989 | Takahaski | 297/378 |
| 4,832,408 | 5/1989 | Bertsch et al. | 297/452.36 |
| 5,098,894 | 3/1992 | Miyajime et al. | 297/452.35 X |
| 5,104,189 | 4/1992 | Hanai et al. | 297/284 R |
| 5,108,151 | 4/1992 | Peters et al. | 297/452.18 |
| 5,711,577 | 1/1998 | Whalen | 297/452.18 X |

*Primary Examiner*—Laurie K. Cranmer
*Attorney, Agent, or Firm*—Brooks & Kushman P.C.

[57] ABSTRACT

A vehicle seat back assembly having a seat back shell to which a foam and a skin layer may be applied to finish a rear facing surface of the seat back shell. First and second seat back support frame members are received in pockets formed by the seat back shell and an inner shell. According to the method of making a vehicle seat back, a seat back shell is formed from a rigid structural material. In one embodiment, the foam layer is molded in situ onto the rear facing surface of the seat back shell and the skin layer is preferably formed over the foam layer. The foam layer and skin layers may also be omitted, leaving the rear facing surface uncovered. A peripheral portion of the skin layer is bonded to the inner surface of the seat back shell. A separately covered cushion is assembled to the inner portion of the seat back shell.

8 Claims, 2 Drawing Sheets

VEHICLE SEAT BACK ASSEMBLY AND METHOD OF MAKING A VEHICLE SEAT BACK ASSEMBLY

TECHNICAL FIELD

The present invention relates to vehicle seat back assemblies and a method of making vehicle seat back assemblies.

BACKGROUND ART

Vehicle seats used in automobiles, trucks, and other vehicles may be relatively complex structures. Conventional vehicle seats included a metal frame, springs, and padding that were upholstered with cloth, leather or vinyl. In the last decade, new developments in vehicle seat design have lead to incorporating foam and other engineering materials to eliminate inner spring construction. Generally, a specially contoured frame is covered with foam on all sides and a complex cover is fabricated to encase the entire vehicle seat structure with cloth, leather or vinyl. The cover must be specially adapted to accommodate hinges, tilt mechanisms, and other seat adjustment mechanisms.

Vehicle seats must meet standards for strength and durability. In addition, vehicle seats should offer design flexibility to allow them to be adapted to various passenger compartment configurations and adjustment mechanisms and other accessories. The appearance of a vehicle seat should allow for appearance treatments ranging from luxurious to sport to economy. Vehicle seats must also allow for efficient utilization of expensive seating fabrics and leather treatments that are frequently demanded by consumers.

Other important considerations in vehicle seat design are cost constraints. Vehicle seat designs should maximize efficient use of materials and ideally reduce labor requirements to provide maximum value.

These and other problems and objectives relating to vehicle seats and methods of making vehicle seats are addressed by the present invention as summarized below.

SUMMARY OF THE INVENTION

The present invention relates to a vehicle seat assembly wherein a seat base and seat back are provided for a vehicle. The seat back includes a support frame which is secured to the seat base. A seat back shell defining a concave cavity and having a rear facing surface oppositely oriented relative to the concave cavity is secured to the support frame. A foam layer is formed on the rear facing surface of the seat back shell and a cushion is secured to the concave cavity defined by the seat back shell.

According to another aspect of the invention, the vehicle seat assembly as described above includes a foam layer which is formed in situ on the seat back shell. The foam layer is preferably covered by a skin layer which encloses a portion of the foam layer and extends partially onto the seat back shell where it may be bonded to the concave cavity.

According to another aspect of the invention, the vehicle seat assembly also includes an inner shell preferably formed in two pieces which are secured to the seat back shell at two spaced locations to form two pockets. The seat back support frame preferably includes two seat back support frame members which are received in the pockets formed by the seat back shell and inner shell members. The vehicle seat back shell preferably includes an X-shaped member interconnecting side walls of the seat back shell and the top flange which interconnects the upper ends of the side walls.

According to another aspect of the invention, the seat back cushion is separately covered in fabric prior to assembly to the shell cavity.

According to the method of the present invention, a vehicle seat back is made by forming a seat back shell from a rigid structural material preferably by an injection molding, blow molding, compression molding or reaction injection molding process. A foam layer may be molded in situ on a rear facing surface of the seat back shell and a skin layer is formed over the foam layer. The skin layer is preferably bonded to a portion of an inner surface of the seat back shell. A separately covered cushion assembled to the inner portion of the seat back shell to complete the vehicle seat.

According to another aspect of the method of present invention, the step of molding the foam layer and forming the skin over the foam layer is performed in a single molding process.

These and other features of the present invention will be apparent to one of ordinary skill in the art upon review of the attached drawings and in light of the following detailed description of the invention.

DETAILED DESCRIPTION OF THE PREFERRED EMBODIMENT

Figure 1:
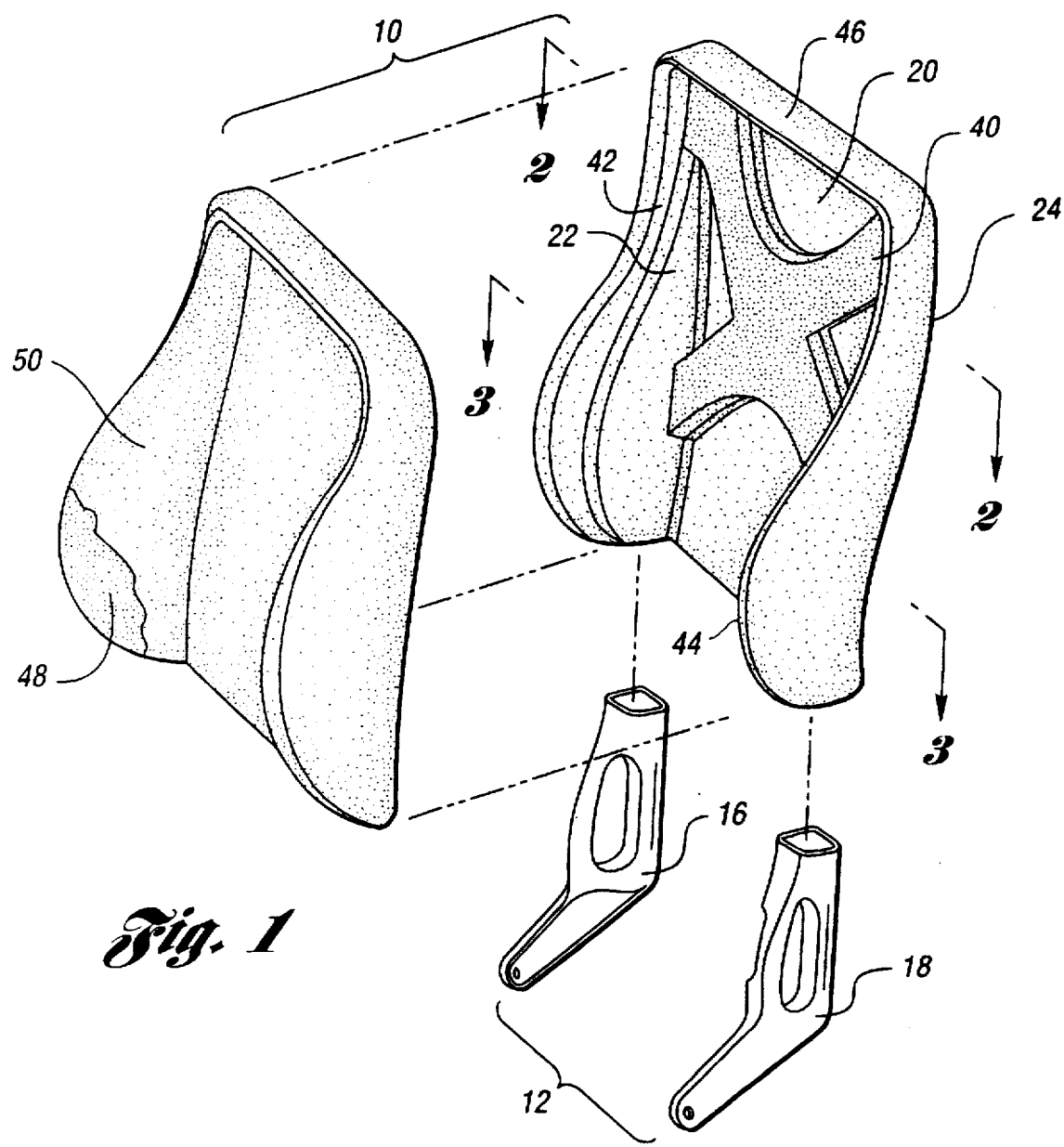
FIG. 1 is an exploded perspective view of a vehicle seat back assembly made according to the present invention.
Figure 2:
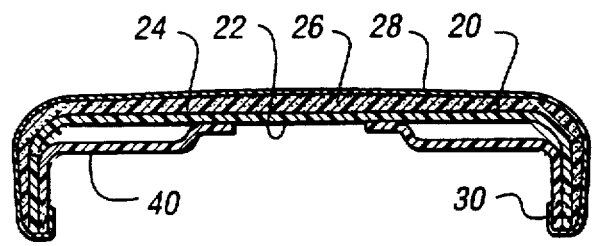
FIG. 2 is a cross-sectional view taken along the line 2—2 in FIG. 1.
Figure 3:
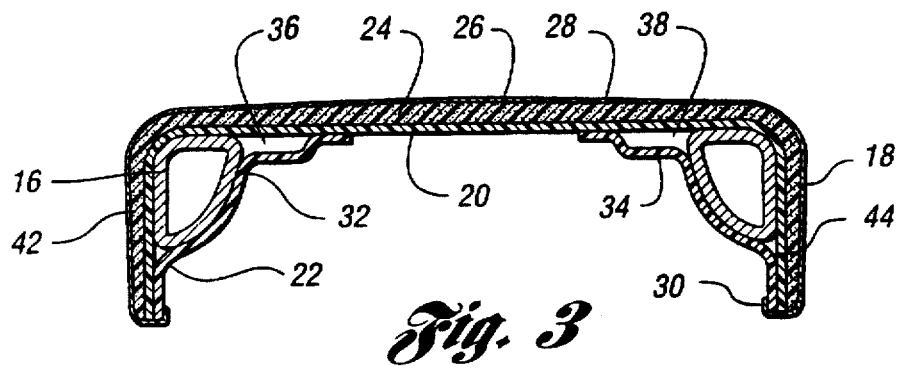
FIG. 3 is a cross-sectional view taken along the line 3—3 in FIG. 1.

Referring now to FIGS. 1, 2 and 3, a seat back 10 is shown with a seat back support frame 12 which comprises first and second seat back support members 16 and 18. A seat back shell 20 may be formed in a wide range of cross-sectional shapes. The seat back shell 20 generally defines a cavity 22 with a concave surface oriented to face the front of a vehicle and a rear facing surface 24. The seat back shell 20 is covered on its rear facing surface 24 with a foam layer 26 which provides padding on the rear facing surface of the seat back shell 20. A skin layer 28 is formed over the foam layer 26. A skin overlap portion 30 is formed about perimeter portions of the skin layer 28 and is preferably bonded or otherwise secured to the periphery of the cavity 22 formed by the seat back shell 20.

The foam layer 26 is preferably formed of a polyurethane foam which is formed in situ on the rear facing surface 24 of the seat back shell 20. Foam layer 28 is preferably covered by a skin layer 28 which is likewise formed in situ over the foam layer 26. The foam layer 26 and skin layer 28 may be formed in a single molding operation by controlling the mold design and molding parameters to allow the foam layer 26 to be formed while the skin layer 28 adjacent the mold forms a skin of unexpanded foam. The skin overlap portion 30 is bonded to the seat back shell 20 so that the foam layer 26 and skin layer 28 are securely retained on the seat back shell 20 to minimize any tendency of the foam layer 26 to become delaminated from the rear facing surface 24.

As an alternative, the present invention may be practiced without the foam layer 26 or skin layer 28 if the seat back shell can meet rear seat head impact criteria without the additional layers. For appearance purposes, it may be desirable to include the skin layer 28 even if the foam layer 26 is not provided. The skin layer 28 can provide a desired surface covering over the seat back shell 20.

First and second inner shells 32 and 34 are either separately formed or formed with the seat back shell 20 in a blow molding operation. If first and second inner shells 32 and 34 are separately formed, they may be bonded or glued to the seat back shell at spaced locations within the cavity 22, which may also be referred to as the rear corners of the cavity 22. If the first and second inner shells 32 and 34 are formed with the seat back shell 20, they may be joined to the seat back shell 20 at the time that the seat back shell 20 and first and second inner shells 32, 34 are formed. First and second pockets 36 and 38 are defined by the first and second inner shells 32 and 34, respectively, and the seat back shell 20.

First and second seat back support members 16 and 18 are received within first and second pockets 36 and 38 to retain the seat back 10 in the proper orientation relative to the lower seat (not shown). Hinges, tilt adjustment mechanisms, and seat back release mechanisms may be simply provided on the first and second seat back support members 16 and 18 without impacting other design considerations.

First and second inner shells 32 and 34 are interconnected by an X-shaped reinforcement 40 which is provided to reinforce and augment the rigidity of the seat back shell 20. The X-shaped reinforcement 40 extends between the first and second inner shells 32 and 34. First and second inner reinforcement shells 32 and 34 may be combined with X-shaped reinforcement 40 in a unitary part. First and second side portions 42 and 44 extend in a generally forward direction to define the sides of the cavity 22. As shown in FIG. 3, first and second inner shells 32 and 34 are spaced apart on the seat back shell 20 and abut first and second side portions 42 and 44. Top side portion 46 spans the top of the seat back shell 20 and extends between first and second side portions 42 and 44 at their upper ends. First, second and top side portions 42, 44 and 46 are on three sides of cavity 22.

Referring to FIG. 1, cushion 48 is formed as a foam bun generally designed to provide back and lateral support for occupants of the vehicle. The cushion 48 is substantially completely received within a cover 50 which is formed of the desired seat cover fabric. The cushion 48, including its cover 50, are received within the cavity 22 and are secured to the cavity by means of glue or appropriate fasteners which may include hook-and-loop fastening tape or appropriate straps.

Figure 4:
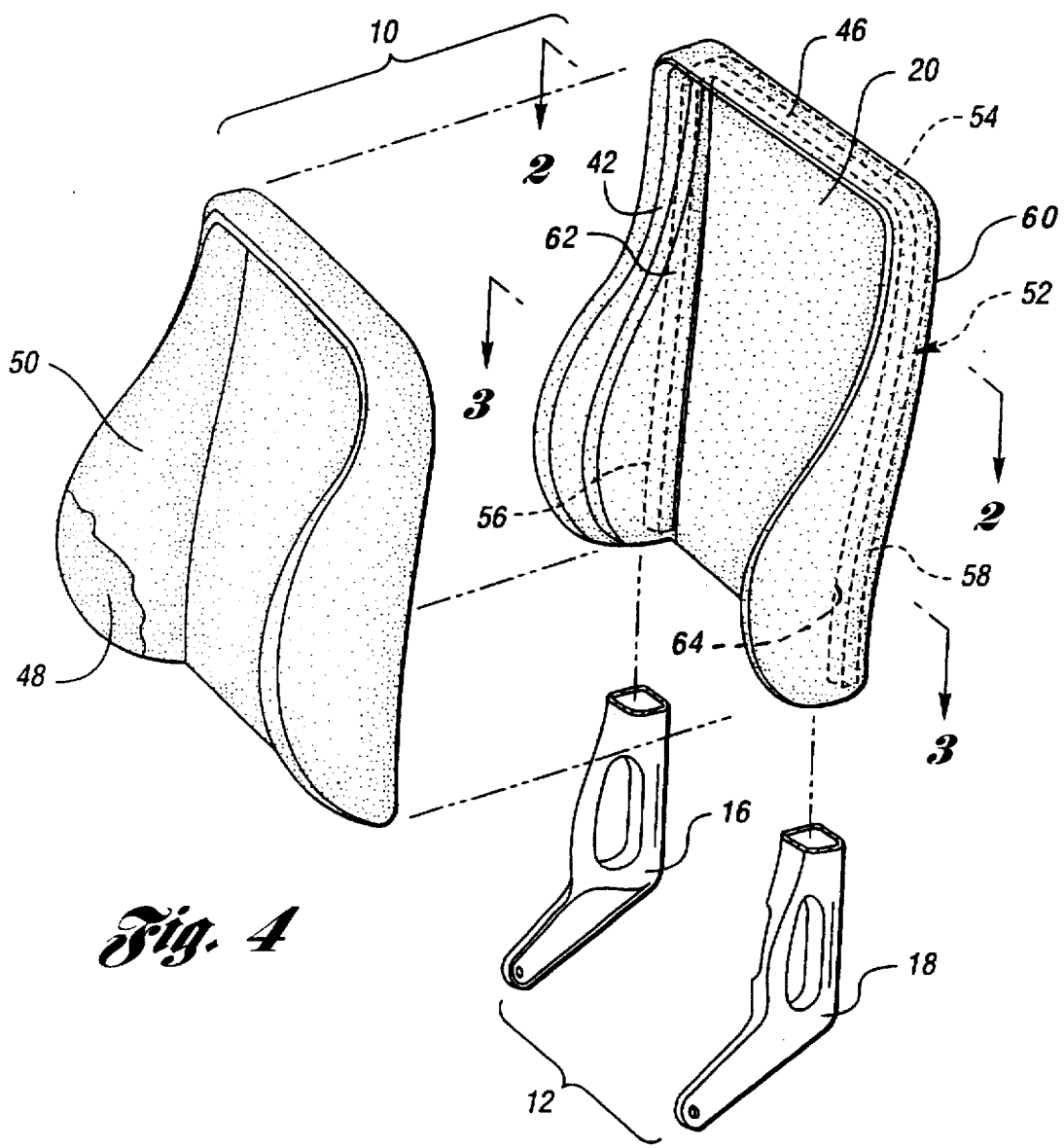
FIG. 4 is an exploded perspective view of an alternative embodiment of a vehicle seat back assembly made according to the present invention.

Referring now to FIG. 4, an alternative embodiment of the present invention is provided which includes a perimeter reinforcement frame 52. The perimeter reinforcement frame 52 comprises top bar 54 which is secured to, or formed with, first side reinforcement 56 and second side reinforcement 58. The top bar may be tubular in construction or may be formed as a solid member. First and second side reinforcements 56 and 58 and top bar 54 are preferably captured between an outer shell 60 and inner shell 62 within a pocket 64 formed by the location of the outer shell 60 and inner shell 62 generally around the periphery thereof. The outer shell 60, as shown in FIG. 4, does not include any foam padding or skin, but is intended to be formed with a molded surface having acceptable surface finish characteristics and is formed to meet relevant rear seat head impact performance criteria.

According to the invention, an attractive, durable seat back is provided without the necessity of covering the seat back with relatively expensive seat cover material. The structural elements of the seat back may be formed largely by simple molding processes which can result in a durable yet soft skinned foam rear facing surface 24 of the seat back 10. The laborious step of pulling a seat cover over the entire assembled seat back is eliminated by this invention.

Referring now to the method of making the vehicle seat back 10 of the present invention, the method includes forming a seat back shell 20 from a rigid structural material such as reaction injection molded plastic, blow molded plastic, or cast or stamped metal. After the seat back shell 20 is formed, a foam layer 26 is molded, preferably in situ, onto a rear facing surface 24 of the seat back shell 20. A skin layer 28 is then formed over the foam layer 26. A skin overlap portion 30 of the skin layer 28 extends outboard of the foam layer 26 and may be bonded to the cavity 22 defined by the seat back shell 20. The seat back 10 is completed by assembling a trimmed foam bun, or cushion 48, into the cavity 22 formed by the seat back shell 20.

The step of forming the seat back shell 20 may be performed by blow molding. If the seat back shell 20 is blow molded, it may be possible to form the inner shells 32 and 34 in the same step that the seat back shell 20 is formed. If the seat back shell 20 is formed by reaction injection molding, process limitations may require that the inner shells 32 and 34 be separately molded and subsequently assembled to the seat back shell 20.

The steps of molding the foam layer 26 and forming the skin 28 over the foam layer 26 is preferably formed in a single molding process. Different compounds may be injected into the mold at different times in the molding process to provide a skinned foam. Alternatively, a single molding compound can be used to mold both the foam layer 26 and the skin layer 28 by adjusting mold temperatures and controlling the addition of blowing agents.

Molding techniques have been developed for molding a foam layer having a skin for other automotive applications including molding applications used to manufacture dashboards and interior trim pieces.

The cushion 48 is preferably covered before being assembled to the seat back shell 20. The cushion may be covered with more expensive seat cover materials on its exposed surfaces with durable, non-decorative fabrics being used to form the portions of the cushion 48 which are enclosed by the seat back shell 20. Alternatively, the cushion could be simply formed of a textured plastic material that would not require covering.

The above description of a preferred embodiment of the present invention is intended to be illustrative of the invention and should not be understood to limit the scope of the invention which is defined by the following claims.

What is claimed is:

1. A vehicle seat back assembly comprising:
   a seat back support frame;
   a seat back shell defining a cavity with a concave surface having a rear facing surface oppositely oriented relative to said concave surface, said shell being secured to said seat back support frame;
   a foam layer formed on said rear facing surface of said seat back shell; and
   a seat back cushion secured to the concave surface defined by said seat back shell;
   an X-shaped reinforcement comprises a portion of the inner shell interconnecting first and second inner shell members to reinforce the seat back shell.

2. A vehicle seat back assembly comprising:

a seat back support frame having a first side reinforcement, a second side reinforcement, and a transverse reinforcement interconnecting first and second side reinforcements;

a seat back shell defining a cavity and having a rear facing surface oppositely oriented relative to said cavity and secured to said seat back support frame;

an inner shell connected to said seat back shell and defining a pocket in which said seat back support frame is received; and a seat back cushion secured within the cavity defined by said seat back shell and said inner shell.

3. The vehicle seat assembly of claim 2 wherein said rear facing surface of said seat back shell is covered by a skin layer which and has a skin overlap portion which extends partially about perimeter portions of said seat back shell into said cavity of said seat back shell.

4. The vehicle seat assembly of claim 2 wherein said seat back support frame includes two upwardly oriented members adapted to be received within the pocket formed by first and second inner shell members.

5. The vehicle seat assembly of claim 2 wherein said transverse reinforcement extends across a top portion of said seat back shell.

6. The vehicle seat assembly of claim 2 wherein said seat back shell includes first and second side wall portions and a top side portion which extend in a generally forward direction to define the sides and top of the cavity.

7. The vehicle seat assembly of claim 2 wherein said cushion is substantially enclosed by a cover.

8. A vehicle seat back assembly comprising:

a seat back support frame;

a seat back shell defining a cavity with a concave surface having a rear facing surface oppositely oriented relative to said concave surface, said shell being secured to said seat back support frame;

a foam layer formed on said rear facing surface of said seat back shell; and a seat back cushion secured to the concave surface defined by said seat back shell;

wherein said cavity includes side surfaces, and an X-shaped reinforcement portion of interconnecting side surfaces which reinforces the seat back shell.

* * * * *